(12) United States Patent
Oguchi (10) Patent No.: US 8,270,897 B2
(45) Date of Patent: Sep. 18, 2012

(54) COMMUNICATION CONTROL METHOD AND RADIO BASE STATION AND RADIO TERMINAL

(75) Inventor: Naoki Oguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 119 days.

(21) Appl. No.: 12/748,026

(22) Filed: Mar. 26, 2010

(65) Prior Publication Data

US 2010/0248615 A1    Sep. 30, 2010

(30) Foreign Application Priority Data

Mar. 30, 2009  (JP) .................................. 2009-82421

(51) Int. Cl.
*H04B 3/36* (2006.01)
*H04B 7/15* (2006.01)
*H04B 1/60* (2006.01)
*H04B 7/185* (2006.01)
*H04B 7/14* (2006.01)
*H04B 7/165* (2006.01)

(52) U.S. Cl. .............. 455/7; 455/11.1; 455/9; 455/13.1; 455/18; 455/22; 455/23; 455/24

(58) Field of Classification Search ............. 455/7, 11.1, 455/9, 13.1, 11, 22, 23, 24
See application file for complete search history.

(56) References Cited

U.S. PATENT DOCUMENTS

| | | | | |
|---|---|---|---|---|
| 5,768,321 A | * | 6/1998 | Watanabe et al. ............. | 375/344 |
| 6,678,341 B1 | * | 1/2004 | Miyake et al. ................ | 375/356 |
| 6,999,725 B2 | * | 2/2006 | Nitta et al. .................... | 455/63.1 |
| 7,209,746 B1 | * | 4/2007 | Kirino et al. .................. | 455/450 |
| 7,706,745 B2 | * | 4/2010 | Sanderford et al. ......... | 455/11.1 |
| 2002/0072329 A1 | * | 6/2002 | Bandeira et al. .................. | 455/7 |
| 2006/0256777 A1 | * | 11/2006 | Kimura et al. ................ | 370/352 |
| 2008/0212587 A1 | * | 9/2008 | Yamasaki ..................... | 370/392 |
| 2009/0209199 A1 | * | 8/2009 | Suga ................................ | 455/7 |

FOREIGN PATENT DOCUMENTS

JP    2008054160    3/2008

* cited by examiner

*Primary Examiner* — Bobbak Safaipour
(74) *Attorney, Agent, or Firm* — Murphy & King, P.C.

(57) ABSTRACT

A communication control method, for a radio communication system including a radio base station, a radio terminal, and a relay station that receives a radio signal transmitted from the radio base station and relays the radio signal to the radio terminal at a transmission frequency different from a reception frequency, includes broadcasting information on one or more transmission frequencies of radio base stations or relay stations from the radio base station; and determining, by the radio terminal, whether transmission-source identification information included in the radio signals that are received before and after switching the reception frequency match, the switching being conducted based on the information broadcasted from one of the radio base station directly and via the relay station, wherein if the radio terminal determines that the transmission-source identification information matches, the radio terminal omits a terminal registering procedure after frame-synchronization with the radio communication system.

8 Claims, 10 Drawing Sheets

| DESTINATION<br>ORIGIN | SBS | NEIGHBORING BS | Pseudo SBS<br>(REPEATER) | Pseudo SBS<br>(REPEATER) |
|---|---|---|---|---|
| SBS | NONE | HO(5) | SWITCHING FREQUENCY (1) | HO(4) |
| Pseudo SBS<br>(REPEATER) | SWITCHING FREQUENCY (2) | HO(6) | SWITCHING FREQUENCY (7) | HO(3) |

| BSID(48bits) | Reference BS | Frequency | Preamble index(8bits) |
|---|---|---|---|
| 0xAAAAAA-000001(NBS) | 0xFFFFFF-FFFFFF | f3 | P2 |
| 0xAAAAAA-400001(AR$_{SBS1}$) | 0xAAAAAA-000001 | f2 | P1 |
| 0xAAAAAA-400002(AR$_{SBS2}$) | 0xAAAAAA-000001 | f3 | P1 |
| 0xAAAAAA-400101(AR$_{SBS}$) | 0xAAAAAA-000002 | f4 | P2 |

FIG.8

| FIELD | SIZE (bit) | VALUE (EXAMPLE) |
|---|---|---|
| Management Message Type | 8 | 0x53 |
| Configuration Change Count | 8 | 0x1 |
| N_NEIGHBORS | 8 | 4 |
| Length | 8 | 0b1 |
| PHY Profile ID | 8 | 0b0010-0000 |
| Neighbor BSID | 24 | 0x000002 |
| Preamble Index/Subchannel Index | 8 | P2 |
| HO Process Optimization | 8 | 0b0001-0101-1111-1111 |
| HO Process Optimization | 4 | 0x2 |
| UCD Configuration Change Count | 4 | 0x2 |
| DCD_settings | Variable | |
| frequency | | f3 |
| UCD_settings | Variable | |
| Length | 8 | 0b1 |
| PHY Profile ID | 8 | 0b0010-0000 |
| Neighbor BSID | 24 | 0x400001 |
| Preamble Index/Subchannel Index | 8 | P1 |
| HO Process Optimization | 8 | 0b0001-0101-1111-1111 |
| DCD Configuration Change Count | 4 | 0xf |
| UCD Configuration Change Count | 4 | 0xf |
| DCD_settings | Variable | |
| frequency | | f2 |
| UCD_settings | Variable | |
| Length | 8 | 0b1 |
| PHY Profile ID | 8 | 0b0010-0000 |
| Neighbor BSID | 24 | 0x400002 |
| Preamble Index/Subchannel Index | 8 | P1 |
| HO Process Optimization | 8 | 0b0001-0101-1111-1111 |
| DCD Configuration Change Count | 4 | 0x6 |
| UCD Configuration Change Count | 4 | 0x6 |
| DCD_settings | Variable | |
| frequency | | f3 |
| UCD_settings | Variable | |
| Length | 8 | 0b1 |
| PHY Profile ID | 8 | 0b0010-0000 |
| Neighbor BSID | 24 | 0x400101 |
| Preamble Index/Subchannel Index | 8 | P2 |
| HO Process Optimization | 8 | 0b0001-0101-1111-1111 |
| DCD Configuration Change Count | 4 | 0x10 |
| UCD Configuration Change Count | 4 | 0x10 |
| DCD_settings | Variable | |
| frequency | | f4 |
| UCD_settings | Variable | |

FIG.9

| BSID(24bits) | Frequency | Preamble index | BS TYPE |
|---|---|---|---|
| 000001 | f1 | P1 | SBS |
| 000002 | f3 | P2 | NBS |
| 400001 | f2 | P1 | NBS(AR$_{SBS1}$) |
| 400002 | f3 | P1 | NBS(AR$_{SBS2}$) |
| 400101 | f4 | P2 | NBS(AR$_{NBS}$) |

FIG.10

COMMUNICATION CONTROL METHOD AND RADIO BASE STATION AND RADIO TERMINAL

CROSS-REFERENCE TO RELATED APPLICATIONS

This application is based upon and claims the benefit of priority of the prior Japanese Patent Application No. 2009-82421, filed on Mar. 30, 2009, the entire contents of which are incorporated herein by reference.

FIELD

The embodiments discussed herein are related to a communication control method, a radio base station, and a radio terminal, all of which may be used in a radio communication system including a relay station that relays radio signals transmitted from the radio base station to the radio terminal.

BACKGROUND

One example of radio communication technology is a technology called WiMAX (Worldwide Interoperability for Microwave Access). The WiMAX is a technology developed as a method for constituting wireless MANs (Metropolitan Area Networks). The WiMAX connects telecommunication carriers and users by radio, instead of telephone lines or optical fiber lines, for example, to allow the MANs, which are wide area networks that interconnect LANs (local area networks) in urban areas or specific areas, to execute wireless transmission. It is said that this allows one radio base station (BS) to cover an area of about 50-km radius at a transmission speed of about 70 Mb/s at the maximum.

In radio access networks, such as the WiMAX, the coverage of radio communication is increased by disposing a plurality of BSs such that radio areas (for example, cells, sectors, etc.) provided by the BSs do not overlap as much as possible and a gap between the radio areas is as small as possible.

However, in places to which radio waves from BSs hardly reach, such as underground shopping areas, analog repeaters (ARs) are sometimes disposed instead of the BSs to expand the radio area at low cost. In such a case, to avoid communication interference between the ARs and the BSs, the ARs perform radio communication using, for example, a center frequency different from a radio frequency used by the BSs.

Thus, when a mobile station (MS) moves between the BSs and the ARs, the MS switches the frequency for use in radio communication.

A known example of technology for the above radio communication system is a method in which a network control management unit determines whether a radio resource available to BSs is greater than or equal to a first traffic radio resource calculated from a desired QoS (quality of service) of a MS, determines whether available radio resources of relay stations that relaying signals from those BSs determined to be true are greater than or equal to a second traffic radio resource calculated from the desired QoS, and controls the communication so that the MS can be connected to one of the relay stations determined to be true.

One example of a method for switching the frequency while a MS continues communication is hand-over (HO). Examples of the HO include controlled HO and uncontrolled HO.

With the controlled HO, the MS receives, for example, a neighboring-BS-information broadcast (MOB_NBR-ADV) message from a serving BS (SBS) at regular intervals, for example, once about 30 seconds. The MOB_NBR-ADV message includes information about a neighboring BS (NBS) neighboring the SBS (for example, information used for synchronizing with the NBS, such as a center frequency of the NBS).

When the MS detects that the intensity of radio waves from the SBS has become lower than a predetermined threshold value, the MS measures (scans) the intensity of radio waves from the NBS to search for a target BS (HO destination). When the intensity of the radio waves from the SBS further decreases to become lower than a HO threshold value, the MS negotiates with the SBS and hands over the connection to the NBS. Specifically, for example, the MS synchronizes (for example, frame-synchronizes) with the NBS and executes a connecting procedure called a network re-entry (terminal registering procedure) to take over the last connection state with the SBS (various kinds of communication information, etc.).

On the other hand, with uncontrolled HO, the MS executes the network re-entry process in synchronization with the NBS when communication with the SBS is disconnected without performing the above-described negotiation with the SBS.

With the uncontrolled HO, the NBS is not notified that the MS performs HO; therefore, the uncontrolled HO is different from the controlled HO in that replication of various kinds of communication information for use in starting communication (for example, context information) is started when the MS connects to the NBS. As a result, the uncontrolled HO requires more time for HO than the controlled HO.

With the above-described radio communication system having an AR, since the BS has no means for transmitting information on the AR to the MS, the MS cannot find the AR. Furthermore, since there is no means for knowing the master-slave relationship between a BS that manages the AR (reference BS) and the AR, a connection-destination switching procedure sometimes cannot be performed normally even if the AR is found.

For example, when a MS in communication with a SBS (radio frequency: f1) that manages an AR (radio frequency: f2) moves to the control of the AR, the MS receives a MOB_NBR-ADV message from the SBS; however, the MOB_NBR-ADV message does not include information on the AR. This is because the conventional MOB_NBR-ADV message contains only information on a NBS, and the AR is not a BS.

Accordingly, the MS cannot perform scanning at the radio frequency (f2) of the AR, so that the MS cannot find the AR as a HO destination in advance.

In this case, if the intensity of radio waves from the SBS falls below a HO threshold value, the MS becomes unable to communicate with the SBS, and therefore, the MS scans (searches) known radio frequencies. At that time, if no NBS or AR can be detected, the MS cannot perform HO, and thus, communication is sometimes disconnected. On the other hand, if the radio frequency (f2) of the AR can be detected by chance, the MS performs, for example, the above-described uncontrolled HO or an initial entry process. The initial entry process is a connection starting procedure that is performed when the MS cannot restart the communication with the SBS within a period during which the SBS holds information on the MS (resource retain time). However, if the MS performs the initial entry process, the time required for the communication process may be several times as much as the time required for HO.

When the MS performs the uncontrolled HO process, the MS executes the network re-entry process along with the HO. However, the target AR substantially communicates with the SBS, with the radio frequency different from that of the SBS (f1≠f2). Therefore, with the network re-entry process, the MS will perform duplicate connection to the SBS (double entry). This may cause mismatch of communication on the BS side or the MS side, which needs the network re-entry process to start reconnection, thus increasing the time required for the communication process.

As described above, when the MS switches communication destination in the radio communication system including the AR, the time required for the communication process sometimes increases.

SUMMARY (1) According to a first aspect, a communication control method for a radio communication system including a radio base station, a radio terminal, and a relay station that receives a radio signal transmitted from the radio base station and relays the radio signal to the radio terminal at a transmission frequency different from a reception frequency is used. The radio base station broadcasts information on one or more transmission frequencies of radio base stations or relay stations (such as a transmission frequency or frequencies of a radio base station or stations, a transmission frequency or frequencies of a relay station or stations, or any combination thereof). The radio terminal determines whether two pieces of transmission-source identification information included in the radio signals that are received before and after switching the reception frequency match, the switching being conducted based on the information broadcasted from one of the radio base station directly and via the relay station, wherein if the radio terminal determines that the two pieces of transmission-source identification information match, the radio terminal omits a terminal registering procedure after frame-synchronization with the radio communication system.

(2) According to a second aspect, a radio base station in a radio communication system including the radio base station, a radio terminal, and a relay station that receives a radio signal transmitted from the radio base station and relays the radio signal to the radio terminal at a transmission frequency different from a reception frequency is used. The radio base station includes a storage unit that stores information on a transmission frequency of the relay station, and a broadcasting unit that broadcasts the information stored in the storage unit.

(3) According to a third aspect, a radio terminal in a radio communication system including a radio base station, the radio terminal, and a relay station that receives a radio signal transmitted from the radio base station and relays the radio signal to the radio terminal at a transmission frequency different from a reception frequency is used. The radio terminal includes a receiving unit that receives information, broadcasted from the radio base station, on one or more transmission frequencies of radio base stations or relay stations; a determination unit that determines whether two pieces of transmission-source identification information included in the radio signals received before and after switching the reception frequency match, the switching being performed based on the information received by the receiving unit from one of the radio base station directly and via the relay station; and a controller that omits a terminal registering procedure after frame-synchronization with the radio communication system if the determination unit determines that the two pieces of transmission-source identification information match.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments will be described with reference to the drawings. However, the embodiments illustrated below are merely examples, and there is no intention to exclude various modifications and applications of the technology specified in the following embodiments. That is, these embodiments may be achieved in various modifications (such as combinations of the embodiments) without departing from the spirit thereof. Here, a network re-entry process and an initial entry process are sometimes simply referred to as a network entry process (terminal registering procedure) for the convenience of description.

[1] Embodiment

Figure 1:
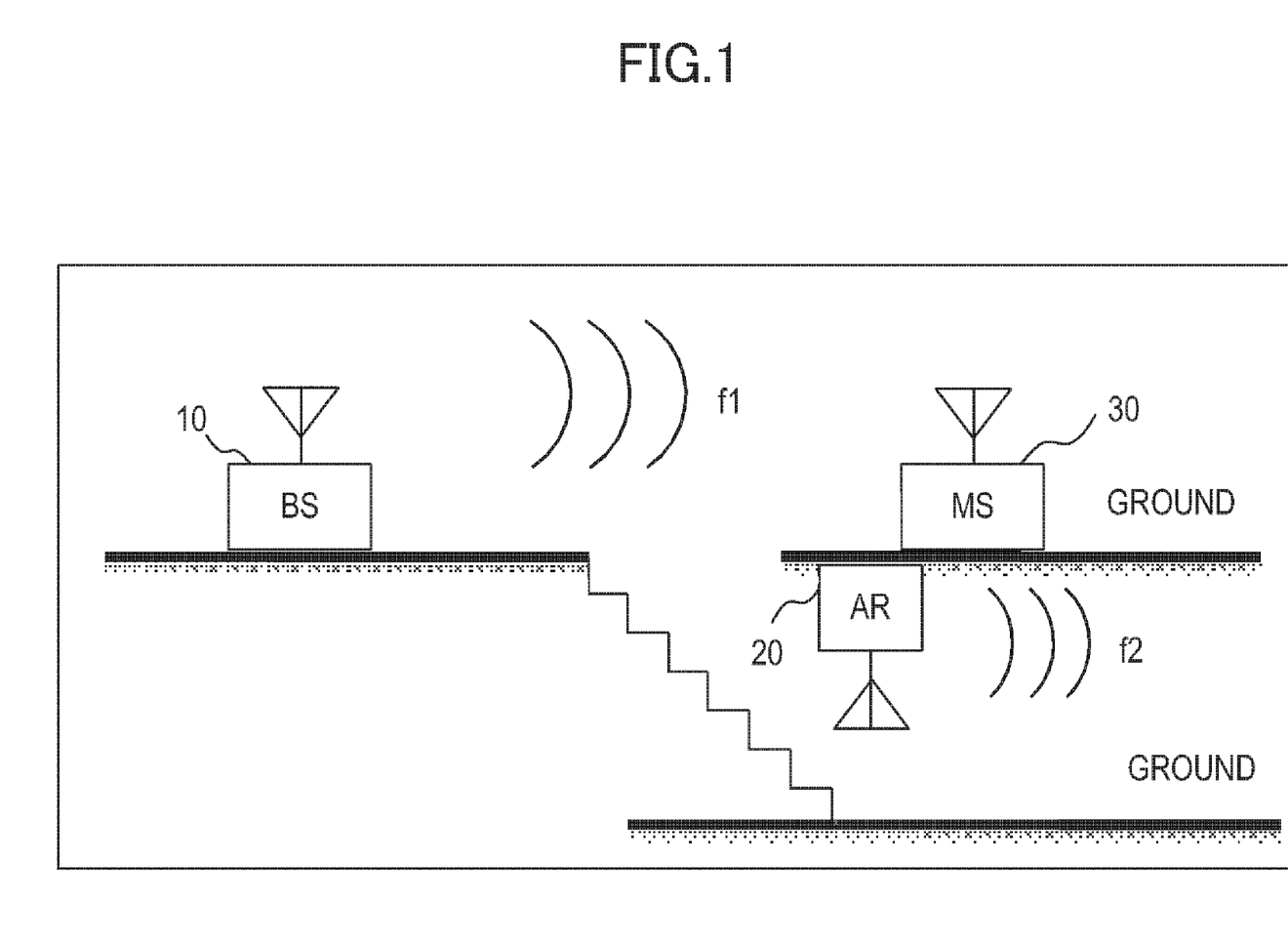
FIG. 1 is an example of the configuration of a radio communication system according to an embodiment.

FIG. 1 is an example of the configuration of a radio communication system according to an embodiment.

The radio communication system illustrated in FIG. 1 includes a radio base station (BS) 10, an analog repeater (AR) 20, and a mobile terminal (MS) 30, for example.

The BS 10 communicates with the MS 30 and the AR 20 by radio. The BS 10 may also communicate with another BS by wire or radio.

The BS 10 may provide a radio area, such as a cell or a sector, and may transmit data to the MS 30 that belongs to the radio area at a predetermined radio frequency (for example, f1). The BS 10 of this example is placed on the ground, for example, and may transmit data received from an upper node (not illustrated) [for example, Access Service Network-Gateway (ASN-GW)] of the BS 10 to the MS 30.

The MS 30 performs radio communication with the BS 10 and the AR 20. For example, the MS 30 may receive a radio signal at a frequency of f1 from the BS 10 in the radio area provided by the BS 10, and for communication with the AR 20, the MS 30 may receive a radio signal relayed from the AR 20 by switching the radio frequency from f1 to f2(≠f1).

The AR 20 provides a radio area, such as a cell or a sector, and relays and transmits the radio signal received from the BS 10 to the MS 30 that belongs to the radio area. At that time, the AR 20 may use the radio frequency f2 different from the radio frequency f1 of the BS 10 to prevent communication interference with the BS 10, for example. The AR 20 of this example is placed under the ground (for example, an underground shopping area, an underground parking area, the inside of a subway or a subway station, or an underpass) but may be disposed on the ground (for example, in a tunnel of an expressway, a railroad, or an ordinary road, the inside of a building, a semi-basement structure zone of a high-rise or middle-rise building, a mountainous area, or a valley). The numbers of BSs 10 and ARs 20 are not limited to the example illustrated in FIG. 1.

Figure 2:
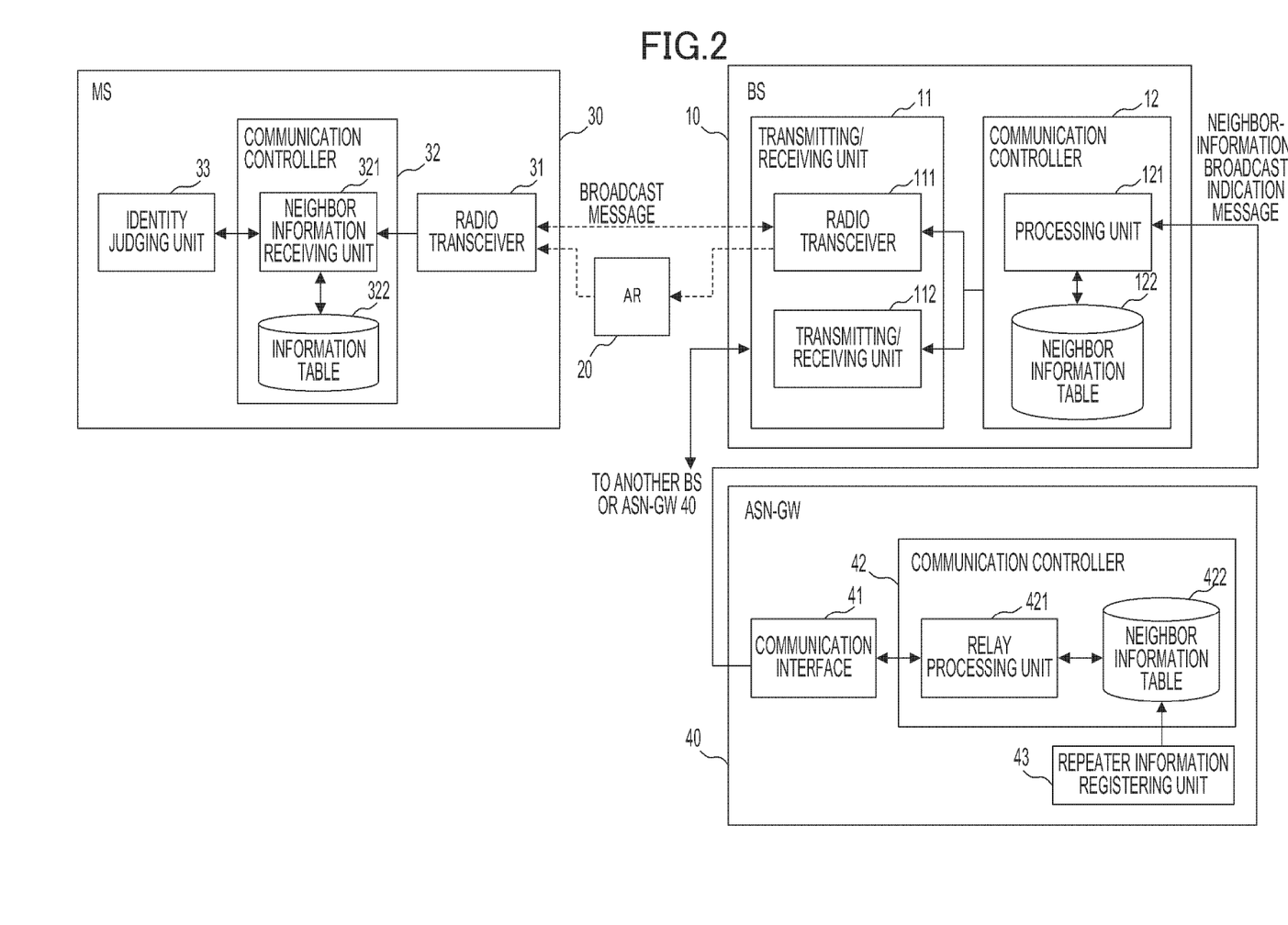
FIG. 2 is an example of the configurations of the radio communication system illustrated in FIG. 1.

Here, FIG. 2 is an example of the configurations of the BS 10, the MS 30, and an ASN-GW 40.

(1.1) ASN-GW 40

The ASN-GW 40 includes a communication interface (IF) 41, a communication controller 42, and a repeater information registering unit 43, for example.

The repeater information registering unit 43 registers information on the AR 20 (AR information) in a neighbor information table 422. The AR information includes, for example, information on a center frequency of one or more ARs 20 and transmission-source identification information (for example, Preamble Index) for identifying the BS 10 that manages the AR 20.

The AR information may also include identification information (for example, BSID) for identifying the AR 20, and association information (for example, reference BS) that indicates the association of the AR 20 and the BS 10. The association information is information indicating whether there is a reference (master-slave) relationship between the AR 20 and the BS 10. The AR information registered by the repeater information registering unit 43 may either be manually input by a system manager or the like or be collected and registered by the ASN-GW 40.

Furthermore, the repeater information registering unit 43 may register information on another BS (neighboring BS) 10 neighboring to the BS 10 (neighboring-BS information). This neighboring-BS information may include, for example, identification information (BSID) for identifying the neighboring BS 10, information on a transmission frequency that one or more neighboring BSs 10 use, and transmission-source identification information (Preamble Index). The neighboring-BS information may either be manually input by, for example, a system manager, or be collected and registered by the ASN-GW 40.

The communication controller 42 manages and controls a plurality of the BSs 10 under the control of the ASN-GW 40. For example, the communication controller 42 maintains connection and controls the communication by transmitting and receiving a control message about communication or calling to and from the plurality of BSs 10.

The communication controller 42 may notify the BSs 10 of the AR information and the neighboring-BS information registered by the repeater information registering unit 43. For this purpose, the communication controller 42 includes a relay processing unit 421 and the neighbor information table 422, for example.

The neighbor information table 422 stores and holds the AR information registered by the repeater information registering unit 43. The neighbor information table 422 may also hold the neighboring-BS information. The neighbor information table 422 may be provided either in a storage unit (for example, a memory) only for the communication controller 42 or in a memory shared with the ASN-GW 40.

The relay processing unit 421 creates a neighbor-information-broadcast indication message including one or both of the AR information and the neighboring-BS information stored in the neighbor information table 422, and sends the neighbor-information-broadcast indication message to the BS 10. This allows the BS 10 to broadcast the content of the AR information and the content of the neighboring-BS information.

The communication interface 41 has a communication interface function of transmission and reception with the plurality of BSs 10 under the control of the ASN-GW 40. The communication interface 41 may transmit, for example, the neighbor-information-broadcast indication message created by the relay processing unit 421 to the BSs 10 via a backbone network (not illustrated).

(1.2) BS 10

Next, the BS 10 includes a transmitting/receiving unit 11 and a communication controller 12, for example.

The communication controller 12 maintains connection with the MS 30 and controls the communication by transmitting and receiving a control message about communication or calling to and from the BS 10.

The communication controller 12 may broadcast, for example, the contents of the AR information and the neighboring-BS information included in the neighbor-information-broadcast indication message from the ASN-GW 40. For this purpose, the communication controller 12 includes a processing unit 121 for creating a broadcast message including one or both of the AR information and the neighboring-BS information and a neighbor information table 122, for example.

The neighbor information table 122 stores and holds one or both of the AR information and the neighboring-BS information included in the neighbor-information-broadcast indication message from the ASN-GW 40.

That is, the neighbor information table 122 of this example functions as an example of a storage for storing information on the transmission frequency of the AR 20 (for example, f2).

The processing unit 121 creates a broadcast message (for example, a MOB_NBR-ADV message) containing one or both of the AR information and the neighboring-BS information stored and held in the neighbor information table 122. The broadcast message created by the processing unit 121 is transmitted to the MS 30 by the transmitting/receiving unit 11.

That is, the processing unit 121 of this example functions as a broadcasting unit that broadcasts the information on the frequency of the AR 20 stored in the neighbor information table 122.

The neighbor information table 122 may manage, for example, the contents of the broadcast message created by the processing unit 121 for each version of the broadcast message.

The transmitting/receiving unit 11 communicates with the MS 30 at a predetermined radio frequency (for example, f1) by radio. The transmitting/receiving unit 11 may communicate with another BS or the ASN-GW 40 by wire (or radio).

For this purpose, the transmitting/receiving unit 11 includes a radio transceiver 111 and a transmitting/receiving unit 112. The transmitting/receiving unit 112 performs transmission and reception with the backbone, for example.

The radio transceiver 111 performs a predetermined radio transmission process on various control messages created by the BS 10 (for example, broadcast messages) to transmit the messages to the MS 30 by radio and receives a radio signal transmitted from the MS 30. The radio transceiver 111 may transmit the radio signal addressed to the MS 30 to the AR 20 by radio.

The radio signal transmitted from the BS 10 includes transmission-source identification information (for example, Preamble Index) for identifying the transmission-source BS 10. The radio signal relayed by the AR 20 also includes the transmission-source identification information. However, since the AR 20 merely relays the radio signal from the reference-source BS 10, the transmission-source identification information is the same as the transmission-source identification information included in the radio signal from the reference-source BS 10.

The transmitting/receiving unit 112 transmits and receives various messages via, for example, another BS or the ASN-GW (not illustrated) and the backbone network. For example, the transmitting/receiving unit 112 may receive a broadcast message or the like from another BS or the ASN-GW.

(1.3) AR 20

The AR 20 relays the radio signal addressed to the MS 30 received from the BS 10 to the MS 30 at a transmission frequency [for example, f2 (≠f1)] different from the transmission frequency (for example, f1) of the BS 10. For example, the AR 20 may provide a predetermined radio area and may relay the radio signal received from the BS 10 to the MS 30 located in the radio area. As described above, the radio signal relayed by the AR 20 includes the same transmission-source identification information as the transmission-source identification information included in the radio signal from the reference-source BS 10.

(1.4) MS 30

On the other hand, the MS 30 includes a radio transceiver 31, a communication controller 32, and an identity judging unit 33, for example.

The radio transceiver 31 receives a radio signal directly from the BS 10 or via the AR 20. For example, the radio transceiver 31 may receive a radio frame or transmit a radio frame to the BS 10 by synchronizing with the transmission frame from the BS 10. This radio signal may include, for example, a broadcast message created by the BS 10.

That is, the radio transceiver 31 of this example functions as an example of a receiving unit that receives information on one or more (neighboring) BSs 10 or the transmission frequency (f2) of one or more ARs 20 broadcasted from the BSs 10.

The communication controller 32 maintains and controls communication with the BS 10 by transmitting and receiving, for example, a control message on communication or calling to and from the BS 10. The communication controller 32 measures the intensity of radio waves from the serving BS 10, and if the radio wave intensity becomes a predetermined threshold value or lower, the communication controller 32 may scan (search) other communication destinations based on the contents of the broadcast message from the BS 10 and may switch the receive frequency.

For this purpose, the communication controller 32 includes a neighbor information receiving unit 321 and a BS information table 322.

The neighbor information receiving unit 321 extracts one or both of the contents of the AR information and the contents of the neighboring-BS information from a broadcast message from the BS 10 received by the radio transceiver 31. The neighbor information receiving unit 321 registers, for example, the contents of the extracted information, with the BS information table 322. Here, the contents to be registered may be part or all of the contents of the AR information and the neighboring-BS information.

The BS information table 322 stores and holds one or both of the contents of the AR information and the contents of the neighboring-BS information registered by the neighbor information receiving unit 321. This allows the communication controller 32 to switch the frequency from the SBS 10 to another communication device (the AR 20 or the neighboring BS 10) based on the information on the radio frequency of the AR 20 or the neighboring BS 10 held in the BS information table 322.

The identity judging unit 33 determines, when the MS 30 changes the communication destination from the serving BS (SBS) 10 to another device [for example, the AR 20 or the neighboring BS (NBS) 10], whether the two pieces of transmission-source identification information included in radio signals received before and after the change match.

For example, after the receive frequency is switched by the communication controller 32 based on the BS information table 322, the identity judging unit 33 may make a determination on the identity before and after the switching based on the contents of the BS information table 322 (for example, transmission-source identification information corresponding to the communication devices before and after the switching).

That is, the identity judging unit 33 of this example functions as an example of a judging unit that determines whether two pieces of transmission-source identification information, included in radio signals received before and after the switching of the receive frequency based on a broadcast message that is received by the radio transceiver 31 directly from the BS 10 or via the AR 20, match.

For example, after the receive frequency is switched, the identity judging unit 33 may detect the transmission-source identification information included in the radio signals received before and after the switching the receive frequency and may make the determination based on the detection result.

Furthermore, the identity judging unit 33 may determine the identity before the switching of the receive frequency based on, for example, the contents of the BS information table 322 (for example, association information corresponding to communication devices before and after the switching).

The communication controller 32 performs a predetermined communication connecting process based on the determination by the identity judging unit 33. For example, if the identity judging unit 33 determines that the two pieces of transmission-source identification information before and after the switching match, the communication controller 32 switches the frequency and omits the network re-entry process (terminal registering procedure) in frame-synchronization with the radio communication system.

Here, an example of the terminal registering procedure will be described.

With the terminal registering procedure, first an initial ranging process is performed between the MS 30 and the BS 10. The initial ranging process may include, for example, an adjustment control process, such as for transmission power, between the BS 10 and the MS 30. Next, the capabilities [transmission power, FEC (forward error correction), etc.] of the physical layers of the BS 10 and the MS 30 are exchanged by acquiring the basic capabilities of the BS 10 and the MS 30. Then, an authentication sequence is performed to exchange decryption keys so that the BS 10 and the MS 30 may individually decode data sent from the other. Next, the MS 30 notifies the BS 10 of MAC-layer related functions and is notified of an authorized connection ID from the BS 10. Then, the BS 10 and the MS 30 acquire an IP address, performs service flow control, such as connection control for exchanging user data and QoS control, and starts a communication service.

If it is determined by the identity judging unit 33 that the two pieces of transmission-source identification information before and after the switching match, the communication controller 32 of this example frame-synchronizes with the radio communication system and omits the above-described terminal registering procedure.

On the other hand, if it is determined by the identity judging unit 33 that the two pieces of transmission-source identification information before and after the switching do not match, the communication controller 32 of this example switches the frequency, frame-synchronizes with the radio communication system, and performs the network re-entry process (terminal registering procedure) or hand-over (HO). At that time, the communication controller 32 may perform the HO while taking over part of connection information before the switching of the frequency (information on communication parameters and service flow).

That is, the communication controller 32 of this example functions as an example of a control unit that omits the terminal registering procedure after frame-synchronization with the radio communication system if it is determined by the identity judging unit 33 that two pieces of transmission-source identification information before and after the switching match.

In this way, since the MS 30 of this example is notified of information on one or more (neighboring) BSs 10 or the operating frequency (f2) of one or more ARs 20 from the BS 10, the AR 20 (or the neighboring BSs 10) may be included in the object to be scanned. As a result of the scanning, the MS 30 may determine whether the connection destination is substantially the same based on the transmission-source identification information included in radio signals before and after the frequency is switched to the radio frequency (f2) of the found AR 20. If the two pieces of transmission-source identification information before and after the switching of the frequency match, the MS 30 omits the network re-entry process after frame-synchronizing with the radio communication system.

Since this allows the redundant protocol procedure to be omitted, radio communication with the BS 10 via the AR 20 may be restarted at high speed, thereby improving the efficiency of the connection process of the MS 30.

(1.5) Example of Operation

Figure 3:
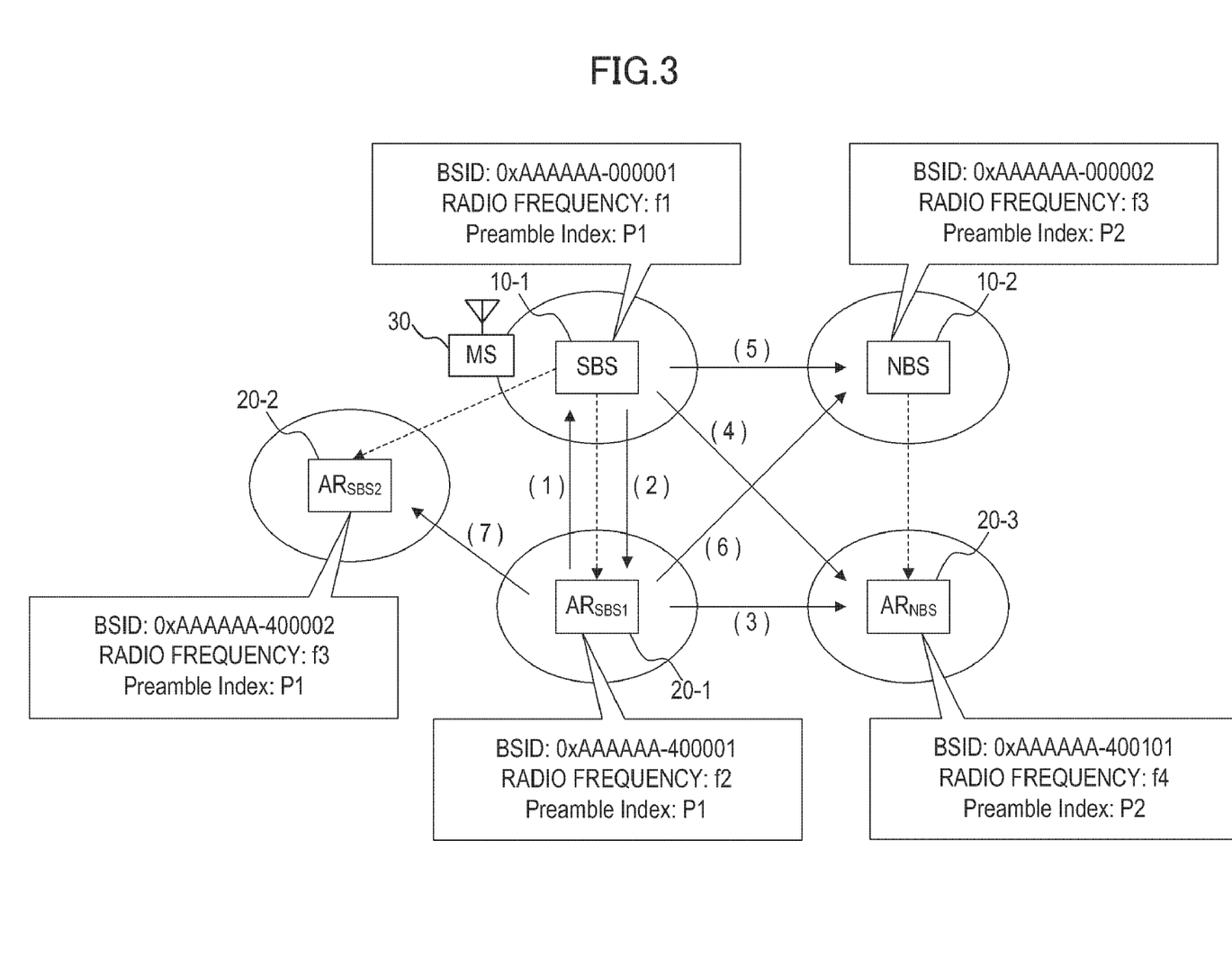
FIG. 3 is an example of the radio communication system illustrated in FIG. 1.

Next, an example of the operation of the above radio communication system will be described with reference to FIGS. 3 to 9. FIG. 3 illustrates an example of the radio communication system as a premise of the description.

As illustrated in FIG. 3, the radio communication system of this example includes the MS 30, an SBS 10-1, an $AR_{SBS1}$ 20-1, $AR_{SBS2}$ 20-2, a neighboring BS (NBS) 10-2, and an $AR_{NBS}$ 20-3, for example. The $AR_{SBS1}$ 20-1 and the $AR_{SBS2}$ 20-2 relay a radio signal from the SBS 10-1 with reference to the SBS 10-1. The $AR_{NBS}$ 20-3 relays a radio signal from the NBS 10-2 with reference to the NBS 10-2.

AR20 may be used to refer to the $AR_{SBS1}$ 20-1, the $AR_{SBS2}$ 20-2, and the $AR_{NBS}$ 20-3 when not distinguished from each other, and BS 10 may be used to refer to the SBS 10-1 and the NBS 10-2 when not distinguished from each other. The numbers of ARs 20 and BSs 10 are not limited to the example illustrated in FIG. 3.

The SBS 10-1 is a BS 10 that is communicating with the MS 30. The SBS 10-1 of this example transmits a radio signal to, for example, the MS 30 that belongs to a radio area provided by the SBS 10-1 at the radio frequency f1. The SBS 10-1 is assigned, for example, "0x000001", as identification information (BSID) for identifying the BS 10. The radio signal transmitted from the SBS 10 includes "P1" as transmission-source identification information (Preamble Index).

The $AR_{SBS1}$ 20-1 and the $AR_{SBS2}$ 20-2 receive the radio signal transmitted from the SBS 10-1 to the MS 30 at a radio frequency f1 and relays the radio signal to the MS 30 at a radio frequency different from f1. For example, the $AR_{SBS1}$ 20-1 may retransmit the radio signal from the SBS 10-1 to the MS 30 at a radio frequency f2 ($\neq$f1), and the $AR_{SBS2}$ 20-2 may retransmit the radio signal from the SBS 10-1 to the MS 30 at a radio frequency f3 ($\neq$f1 and f2).

Here, for example, the $AR_{SBS1}$ 20-1 is assigned "0x400001" as BSID, and the $AR_{SBS2}$ 20-2 is assigned "0x400002" as BSID. Since the $AR_{SBS1}$ 20-1 and the $AR_{SBS2}$ 20-2 relay the radio signal from the SBS 10-1 as is while changing only the frequency, the radio signals relayed from the $AR_{SBS1}$ 20-1 and the $AR_{SBS2}$ 20-2 include the same preamble index "P1" as of the SBS 10-1.

On the other hand, the NBS 10-2 is a BS 10 neighboring to the SBS 10-1. The NBS 10-2 of this example transmits a radio signal to the MS 30 that belongs to a radio area provided by the NBS 10-2 at the radio frequency f3 ($\neq$f1, f2, and f4). The NBS 10-2 is assigned, for example, "0x000002" as BSID, and the radio signal transmitted from the NBS 10-2 includes preamble index "P2".

The $AR_{NBS}$ 20-3 may receive the radio signal transmitted from the NBS 10-2 to the MS 30 at a radio frequency f3 and relays the radio signal to the MS 30 at a radio frequency f4 ($\neq$f3) different from f3. The $AR_{NBS}$ 20-3 is assigned "0x400101" as the BSID. Since the $AR_{NBS}$ 20-3 relays the radio signal from NBS 10-2 while changing only the frequency, the radio signal relayed from the $AR_{NBS}$ 20-3 includes the same preamble index "P2" as that of the NBS 10-2.

In such a radio communication system, the MS 30 has moving patterns, for example, indicated by arrows (1) to (7) in FIG. 3.

The moving pattern indicated by arrow (1) is a moving pattern in which the MS 30 moves from a radio area provided by the $AR_{SBS1}$ 20-1 to the radio area provided by the SBS 10-1. The moving pattern indicated by arrow (2) is a moving pattern in which the MS 30 moves from the radio area provided by the SBS 10-1 to the radio area provided by the $AR_{SBS1}$ 20-1, opposite to the moving pattern of arrow (1).

The moving pattern indicated by arrow (3) is a moving pattern in which the MS 30 moves from the radio area provided by the $AR_{SBS1}$ 20-1 to a radio area provided by the $AR_{NBS}$ 20-3. The moving pattern indicated by arrow (4) is a moving pattern in which the MS 30 moves from the radio area provided by the SBS 10-1 to the radio area provided by the $AR_{NBS}$ 20-3.

The moving pattern indicated by arrow (5) is a moving pattern in which the MS 30 moves from the radio area provided by the SBS 10-1 to a radio area provided by the NBS 10-2. The moving pattern indicated by arrow (6) is a moving pattern in which the MS 30 moves from the radio area provided by the $AR_{SBS1}$ 20-1 to the radio area provided by the NBS 10-2. The moving pattern indicated by arrow (7) is a moving pattern in which the MS 30 moves from the radio area provided by the $AR_{SBS1}$ 20-1 to the radio area provided by the $AR_{SBS2}$ 20-2.

Figure 4:
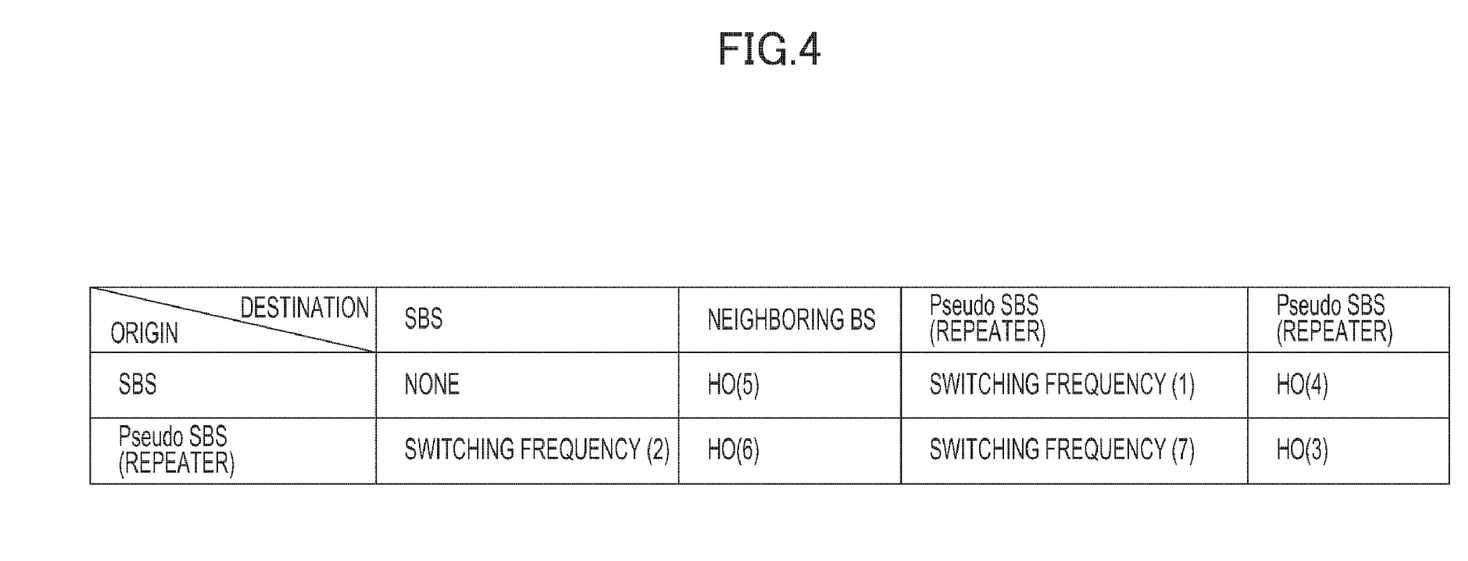
FIG. 4 is the moving patterns of a MS.

The moving patterns of the MS 30 exemplified by arrows (1) to (7) are listed on the table in FIG. 4. The MS 30 may perform two kinds of operations depending on the individual moving patterns.

For example, with the moving patterns (1), (2), and (7), the MS 30 communicates with substantially the same BS (for example, SBS 10-1) before and after the movement. Therefore, the MS 30 performs only the switching of the radio frequency and omits the network re-entry process. On the other hand, with the moving patterns (3), (4), (5), and (6), the MS 30 belongs to a different BS (for example, NBS 10-2)

after the movement. Therefore, the MS 30 switches the radio frequency and performs hand-over (HO) and the network re-entry process.

An example of the operation of the MS 30 of this example will be described hereinbelow.

Figure 5:
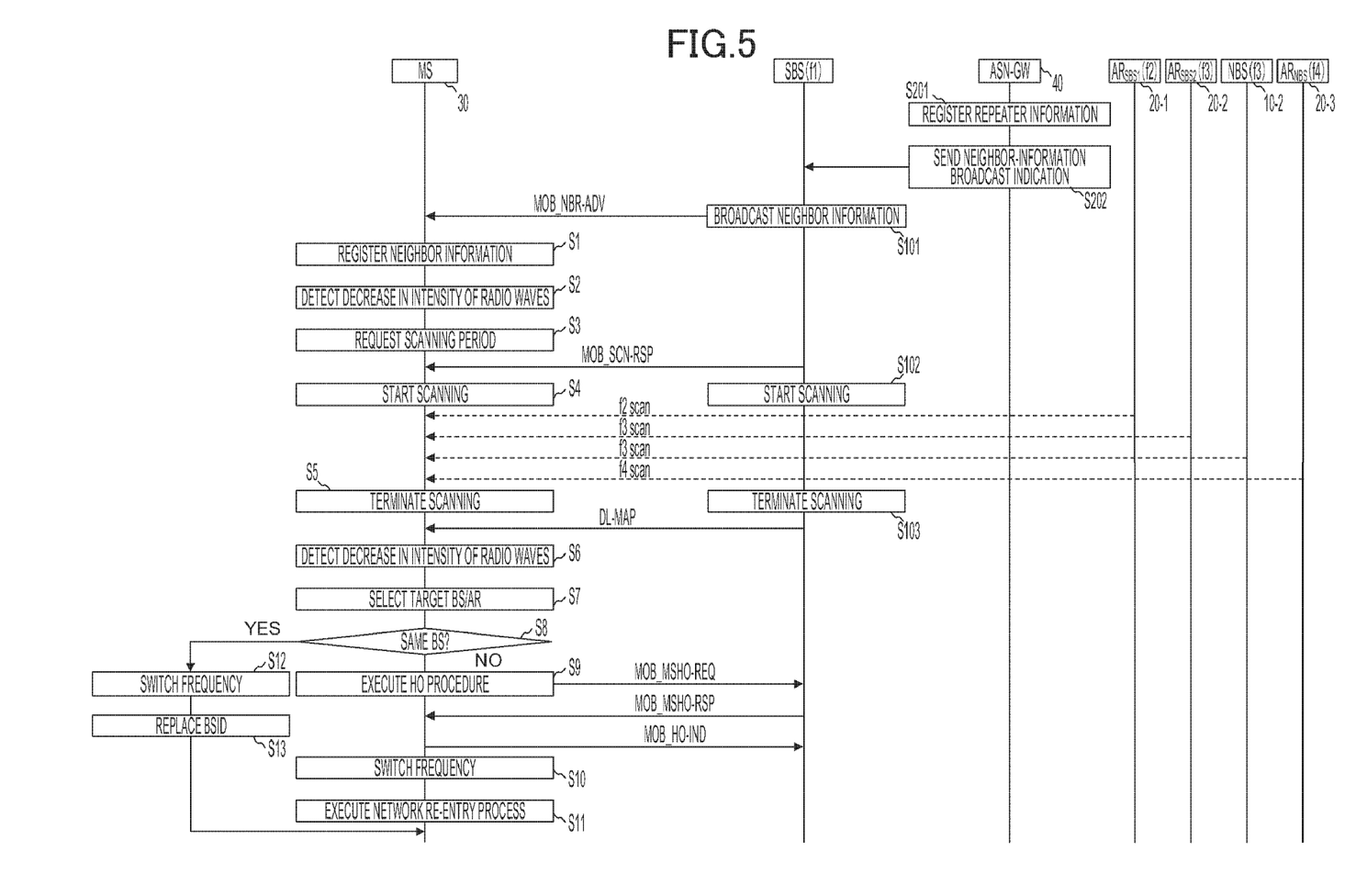
FIG. 5 is an example the operation of the radio communication system illustrated in FIG. 3.

Here, FIG. 5 is a flowchart illustrating an example of the operation of the radio communication system of this example.

First, as exemplified in FIG. 5, the repeater information registering unit 43 registers information on the AR 20 and the NBS 10-2 (AR information and neighboring-BS information) as a neighboring-BS list (step S201).

The AR information includes, for example, BSID for identifying the AR 20, association information (reference BS) indicating the association of the AR 20 and the BS (reference BS) 10 that manages the AR 20, the transmission frequency (Frequency) of the AR 20, and transmission-source identification information (Preamble Index).

Figure 6:
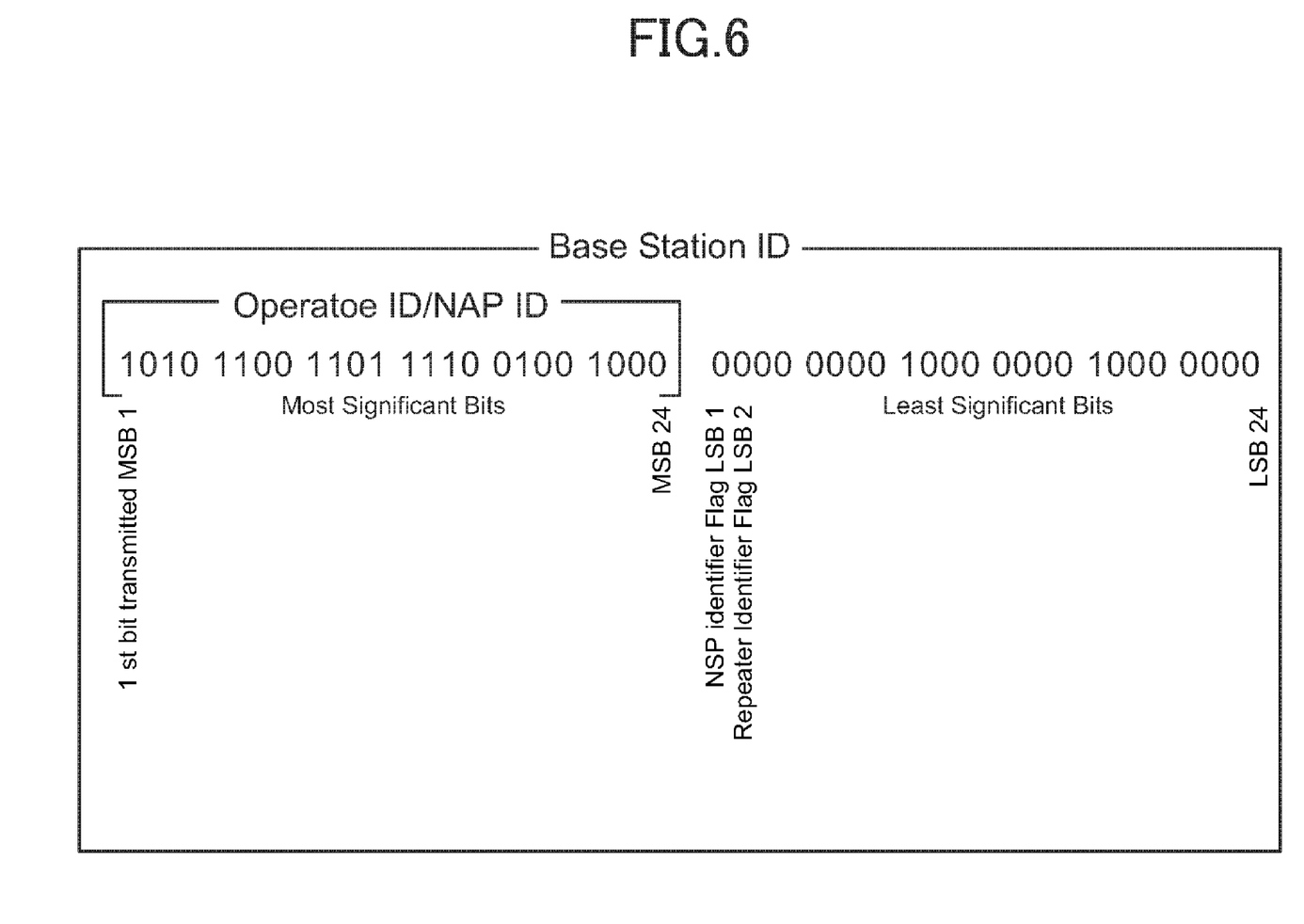
FIG. 6 is an example of BSID.

Here, the rules exemplified below may be applied to the BSID assigned to the AR 20.

As exemplified in FIG. 6, the BSID is a unique 48-bit identification number. The higher-order 24-bits [Most Significant Bits (MSB)] region of the BSID is a region for carrier identification information (Operator ID/NAP ID) that identifies a communication carrier that provides a radio access network. The same value is set for the BSID of a communication device that belongs to the same communication carrier. On the other hand, the most significant bit of the lower-order 24 bits [Least Significant Bits (LSB)] of the BSID has been preset as an NSP identifier flag.

In this example, for example, the lower 23-th bit of the LSB of the BSID is used as a repeater identifier flag. That is, to assign the BSID to the AR 20, "1" is set to the repeater identifier flag. This allows identification whether the communication device is the BS 10 or the AR 20 using the BSID. A method for assigning the BSID to the AR 20 is not limited thereto.

Figure 7:
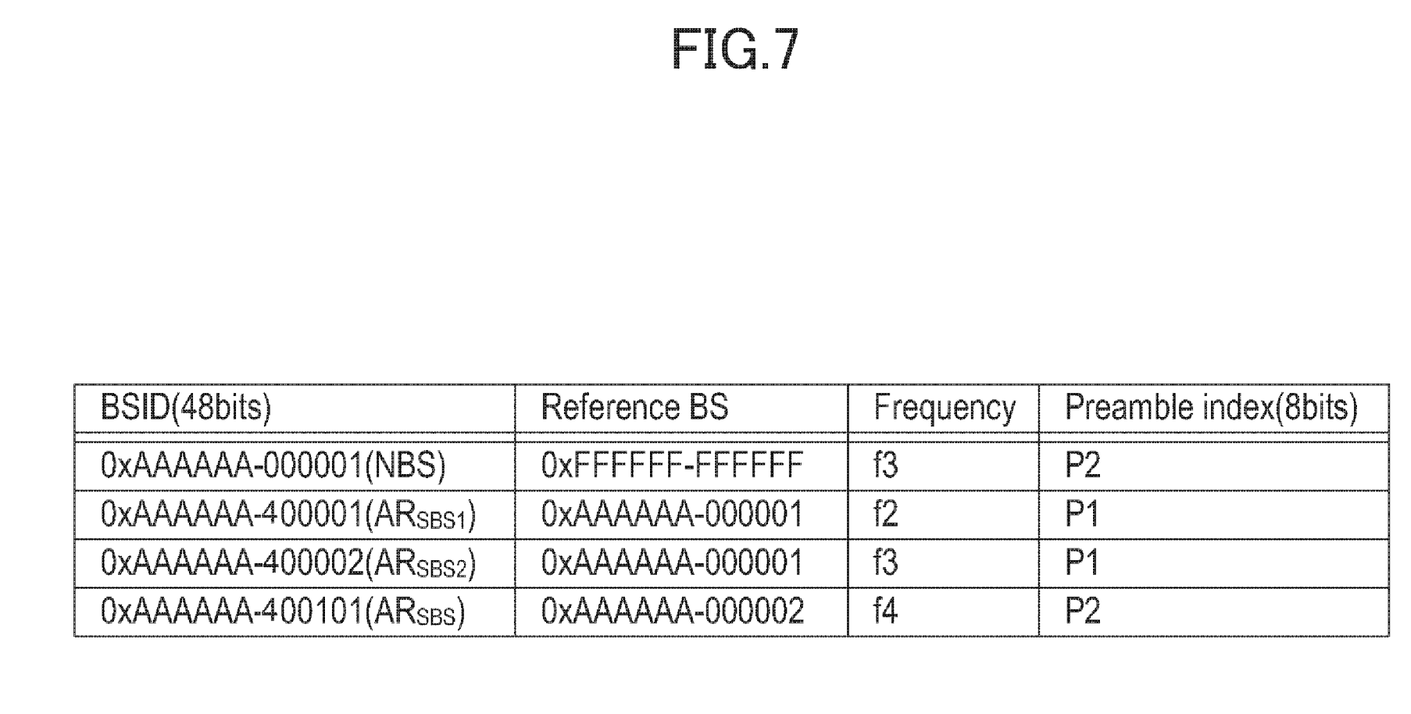
FIG. 7 is an example of a neighboring-BS list.

FIG. 7 illustrates an example of the neighboring-BS list stored in the neighbor information table 422.

In the example illustrated in FIG. 7, the information of the NBS 10-2, the $AR_{SBS1}$ 20-1, the $AR_{SBS2}$ 20-2, and the $AR_{NBS}$ 20-3 that neighbor to the SBS 10-1 (neighboring-BS information and AR information) is stored as a neighboring-BS list for the SBS 10-1. The neighbor information table 422 may store neighboring-BS lists related to BSs 10 or ARs 20 adjacent to the BSs 10 that the ASN-GW 40 manages and controls. The neighboring-BS list illustrated in FIG. 7 is one entry of the neighboring-BS list for the SBS 10-1.

In the neighboring-BS list, BSID (48 bits) is identification information assigned to the BS 10 or the AR 20 by the repeater information registering unit 43. In this example, since "1" is set to the lower 23-th bit of the BSID assigned to the AR 20, as described above, the LSB of the BSID of the AR 20 starts from "4".

In the example of the neighboring-BS list illustrated in FIG. 7, "0xAAAAAA-000002" is assigned to the BSID of the NBS 10-2; "0xAAAAAA-400001" is assigned to the BSID of the $AR_{SBS1}$ 20-1; "0xAAAAAA-400002" is assigned to the BSID of the $AR_{SBS2}$ 20-2; and "0xAAAAAA-400101" is assigned to the BSID of the $AR_{NBS}$ 20-3. The number "0xAAAAAA" that is the MSB of each BSID is Operator ID/NAP ID for identifying a communication carrier, as described above.

Reference BS (association information) is information indicating a BS 10 that is the transmission source of a radio signal that the AR 20 relays. Since a transmission source (reference) BS 10 may not be defined in BSs 10, for example, "0xFFFFFF-FFFFFF" is assigned thereto.

In the example illustrated in FIG. 7, "0xFFFFFF-FFFFFF" is assigned to the association information of the NBS 10-2, and the BSID of the SBS 10-1, "0xAAAAAA-000001", is assigned to the association information of the $AR_{SBS1}$ 20-1. Likewise, "0xAAAAAA-000001" is assigned to the association information of the $AR_{SBS2}$ 20-2, and the BSID of the NBS 10-2, "0xAAAAAA-000002", is assigned to the association information of the $AR_{NBS}$ 20-3.

Frequency indicates transmission frequencies that the BS 10 or the ARs 20 use. In the example illustrated in FIG. 7, the transmission frequencies of the NBS 10-2, the $AR_{SBS1}$ 20-1, the $AR_{SBS2}$ 20-2, and the $AR_{NBS}$ 20-3 are f3, f2, f3, and f4 in this order.

Preamble Index (8 bits) is transmission-source identification information on a radio signal for distinguishing BSs 10. In this example, a radio signal transmitted from the SBS 10-1 includes "P1", and a radio signal transmitted from the NBS 10-2 includes "P2".

A radio signal relayed from the AR 20 includes the same Preamble Index as that of a reference-source BS 10. In this example, for example, radio signals transmitted from the NBS 10-2 and the $AR_{NBS}$ 20-3 managed by the NBS 10-2 include "P2". Radio signals transmitted from the SBS 10-1 and the $AR_{SBS1}$ 20-1 and the $AR_{SBS2}$ 20-2 managed by the SBS 10-1 include "P1". Thus, Preamble Index included in the radio signals transmitted from the individual communication devices are registered in the neighboring-BS list illustrated in FIG. 7. In addition to the above parameters, the neighboring-BS list may include parameters unique to the individual BSs 10 or the ARs 20. These unique parameters may also be registered by the repeater information registering unit 43.

Next, the ASN-GW 40 notifies the SBS 10-1, at regular or irregular intervals, of the contents of the above neighboring-BS list registered by the repeater information registering unit 43, included in a neighbor-information-broadcast indication message, via the backbone line (step S202). Thus, the SBS 10-1 that has received the neighbor-information-broadcast indication message may broadcast the contents of the above neighboring-BS list to the MS 30. The ASN-GW 40 may also notify another BS 10-2 etc. of the neighbor-information-broadcast indication message.

The neighbor-information-broadcast indication message includes, for example, the contents of the above neighboring-BS list (see FIG. 7) and connection parameters, such as Downlink Channel Descriptor (DCD) and Uplink Channel Descriptor (UCD), which are used when the MS 30 connects to the BS 10.

The SBS 10-1 that has received the neighbor-information-broadcast indication message from the ASN-GW 40 creates a MOB_NBR-ADV message including the contents of the above neighboring-BS list and broadcasts the MOB_NBR-ADV message to the MS 30 (step S101).

Figure 8:
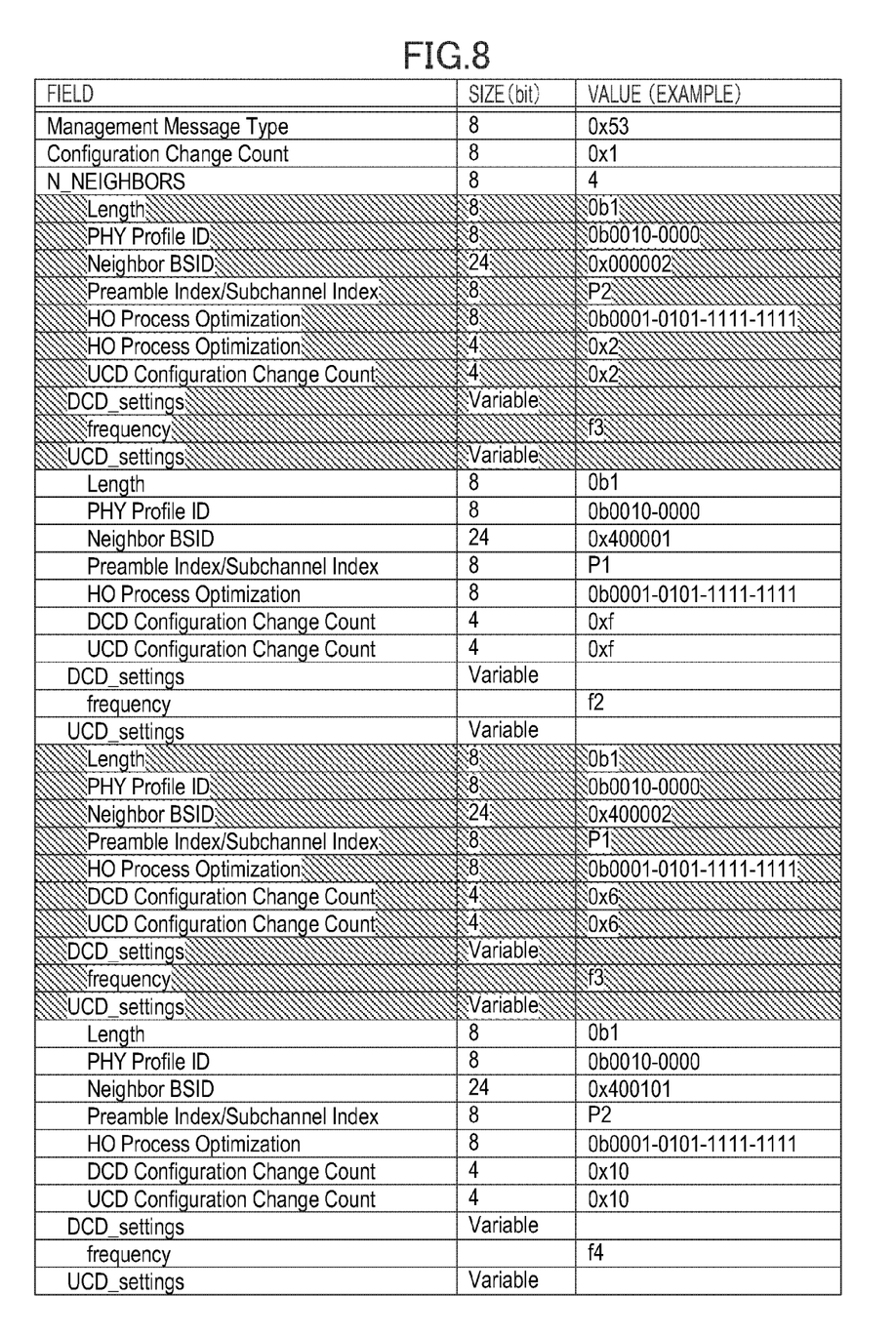
FIG. 8 is an example of a MOB_NBR-ADV message.

Here, FIG. 8 illustrates an example of the field, size, and value in the MOB_NBR-ADV message.

Management Message Type indicates the kind of the message. In IEEE802.16e-2005, "0x53" is defined as a value indicating that the message is the MOB_NBR-ADV message.

Configuration Change Count indicates the version of the message. Configuration Change Count is shared by the BS 10 and the MS 30. For example, the MS 30 may indicate the contents of the field included in the message, to the BS 10, by designating an order (index) in which the neighboring BS 10 is described with Configuration Change Count.

N_NEIGHBORS indicates the number of neighboring BSs 10 or ARs 20 included in the message. Information on the neighboring BSs 10 or ARs 20 is repeatedly described after the N_NEIGHBORS by a number corresponding to N_NEIGHBORS by FOR loop. In the example illustrated in FIG. 7, since N_NEIGHBORS=4, an information element group related to the four communication devices, the NBS 10-2, $AR_{SBS1}$ 20-1, $AR_{SBS2}$ 20-2, and the $AR_{NBS}$ 20-3, is stored.

Length indicates the sum total of the sizes of information elements related to one neighboring BS 10 or AR 20 in the above FOR loop.

PHY Profile ID is a parameter indicating whether the various settings of the neighboring BS 10 or AR 20 are substantially the same as the settings of the SBS 10-1. The use of the parameter allows information of the same settings as the SBS 10-1 to be omitted from the message. In this case, the MS 30 may copy and use the parameter of the SBS 10-1.

Neighbor BSID is BSID assigned to the neighboring BS 10 or AR 20.

Preamble Index/Subchannel Index is a base-station identification code embedded in the Preamble of a radio signal transmitted from the neighboring BS 10 or AR 20.

HO Process Optimization is information indicating what process of the network re-entry procedure may be omitted. For example, when the MS 30 executes HO to the neighboring BS 10, the network re-entry procedure is needed; however, some of the network re-entry procedure may be omitted by transferring part of MS-30 connection information from the SBS 10-1 to the neighboring BS 10. The MS 30 may select a BS 10 for which the network re-entry procedure may be minimized as a HO candidate based on this information.

DCD Configuration Change Count indicates the version of a DCD that the neighboring BS 10 is transmitting. UCD Configuration Change Count indicates the version of a UCD that the neighboring BS 10 is transmitting. The MOB_NBR-ADV message includes the content of the DCD and UCD that the neighboring BS 10 is transmitting at regular intervals as DCD_settings and UCD_settings, respectively.

DCD_settings is a composite TLV (Type/Length/Value) composed of a plurality of TLVs. Various TLVs in the DCD that the neighboring BS 10 is transmitting are collectively stored in DCD_setting TLV. DCD_settings includes only TLVs different from the DCD of the SBS 10-1.

An element, "frequency", indicates the transmission frequency of the neighboring BS 10 or AR 20 and is a sub TLV included in DCD_settings TLV. When the transmission frequency is the same as the radio frequency of the SBS 10-1, "frequency" may be omitted.

UCD_settings is a composite TLV composed of a plurality of TLVs. Various TLVs in the UCD that the NBS 10-2 is transmitting are collectively stored in UCD_setting TLV. UCD_settings may include only TLVs different from the UCD of the SBS 10-1.

Next, on reception of the MOB_NBR-ADV message from the SBS 10-1, the MS 30 registers the contents of the AR information and the neighboring-BS information included in the MOB_NBR-ADV message with the BS information table 322 (step S1).

Furthermore, for example, to enable the frequency to be switched from the AR 20 to the SBS 10-1, the MS 30 acquires information on the SBS 10-1 (BSID, Frequency, Preamble Index, BS type, etc.) during communication with the SBS 10-1 and stores the information in the BS information table 322. This is because the MOB_NBR-ADV message received from the SBS 10-1 does not include information on the SBS 10-1. Thus, the MS 30 may switch the communication destination to the SBS 10-1.

Figure 9:
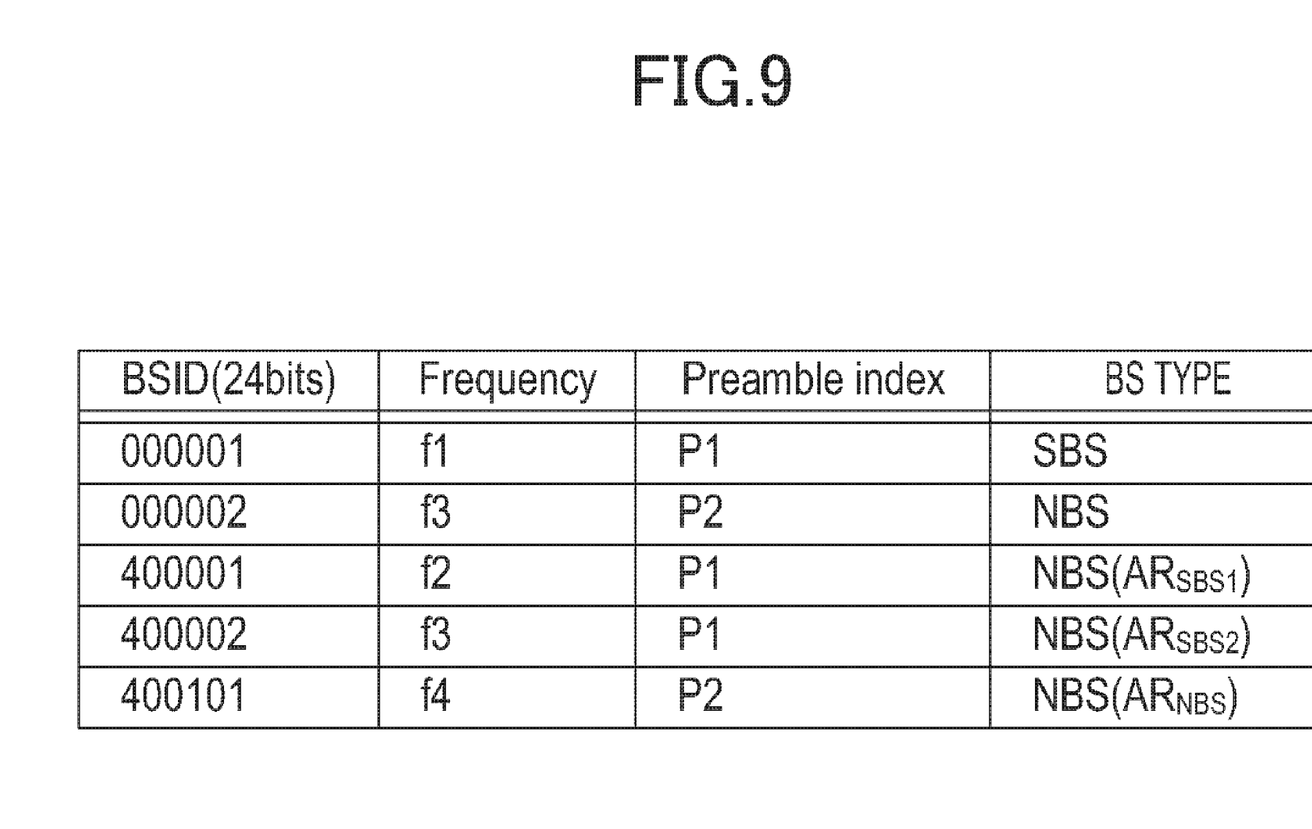
FIG. 9 is an example of a BS information table.

FIG. 9 illustrates an example of the content of the BS information table 322.

BSID (24 bits) indicates the LSBs of the BSIDs assigned to the BSs 10 and the ARs 20. With the same communication carrier, the MSBs of the BSIDs are the same, so that the BS 10 and the AR 20 may be identified only with the LSB of the BSID. The MS 30 may store all the bits of the BSID in the BS information table 322.

BS type is information indicating the type of communication devices. In the example illustrated in FIG. 9, "SBS" is assigned to the BS type of the SBS 10-1, and "NBS" is assigned to the BS type of the NBS 10-2. "NBS" is assigned to the BS type of the $AR_{SBS1}$ 20-1, the $AR_{SBS2}$ 20-2, and the $AR_{NBS}$ 20-3. That is, the MS 30 of this example may recognize communication devices (NBS 10-2 and AR 20) other than the SBS 10-1 as neighboring BSs 10.

As illustrated in FIG. 9, the MS 30 registers, for example, BSID "000001", Frequency "f1", Preamble Index "P1", and BS type "SBS" as information on the SBS 10-1. The MS 30 registers BSID "000002", transmission frequency "f3", Preamble Index "P2", and BS type "NBS" as information of the NBS 10-2 based on the MOB_NBR-ADV message. Furthermore, the MS 30 registers BSID "400001", transmission frequency "f2", Preamble Index "P1", and BS type "NBS" as information of the $AR_{SBS1}$ 20-1; BSID "400002", transmission frequency "f3", Preamble Index "P1", and BS type "NBS" as information of the $AR_{SBS2}$ 20-2; and BSID "400101", transmission frequency "f4", Preamble Index "P2", and BS type "NBS" as information of the $AR_{NBS}$ 20-3.

Next, the MS 30 determines whether the intensity of radio waves from the SBS 10-1 is lower than or equal to a preset scanning threshold value (step S2). If it is determined that the intensity of radio waves from the SBS 10-1 is lower than or equal to the scanning threshold value, the MS 30 transmits a control message (MOB_SCN-REQ message) for requesting a scanning period from the SBS 10-1 (step S3). The MOB_SCN-REQ message may include, for example, information on the NBS 10-2 and the AR 20 held in the BS information table 322.

The SBS 10-1 that has received the MOB_SCN-REQ message determines whether the MS 30 requests a scanning process without association or a scanning process with association. The association indicates that the MS 30 performs a ranging process on the NBS 10-1 or AR 20 that is a HO candidate in which adjustments of transmission power, frequency, and timing are completed in advance before the HO is executed. This allows the network re-entry process to be completed early after the HO process.

Without the association, the SBS 10-1 that has received the MOB_SCN-REQ message does not need to negotiate the association in advance, via the backbone, with the target NBS 10-2 or AR 20 indicated by the message. Accordingly, the SBS 10-1 responds to requests of the MS 30 for scanning process time, interleaving interval, the number of repetitions of scanning, etc. that the MS 30 requested with the MOB_SCN-REQ message using a MOB_SCN-RSP message.

On the other hand, with the association, the SBS 10-1 that has received the MOB_SCN-REQ message negotiates the association in advance, via the backbone, with the target NBS 10-2 or AR 20 indicated by the message. In this case, if the target device is the BS 10, the SBS 10-1 performs the negotiating process on the BS 10 based on BSID included in the MOB_SCN-REQ message, and if the target device is the AR 20, the SBS 10-1 performs the negotiating process on the BS 10 that is the reference of the AR 20. The SBS 10-1 responds to requests of the MS 30 for scanning process time, interleaving interval, the number of repetitions of scanning, etc. that the MS 30 requested with the MOB_SCN-REQ message using a MOB_SCN-RSP message.

The MS 30 that has received the MOB_SCN-RSP message from the SBS 10-1 starts scanning of the radio frequencies of the NBS 10-2 and the AR 20 based on the contents of the BS information table 322 (step S4).

For example, the MS 30 executes processes up to the process of preamble synchronization and determines which of the BSs 10 or ARs 20 the MS 30 may synchronize with.

In this example, the MS 30 may synchronize with the radio frequencies f2, f3, and f4, and finds the preamble index "P1" of the $AR_{SBS1}$ 20-1 at the frequency f2. Likewise, the MS 30 finds the preamble index "P2" of the NBS 10-2 and the preamble index "P1" of the $AR_{SBS2}$ 20-2 at the frequency f3. The MS 30 finds the preamble index "P2" of the $AR_{NBS}$ 20-3 at the frequency f4. Then, the MS 30 performs preamble synchronization with the NBS 10-2 and the AR 20, measures the individual intensities of the radio waves, and terminates the scanning process on the transmission frequencies (f2 to f4) of the NBS 10-2 and the AR 20 (step S5).

During the above scanning process (step S102 to step S103), the SBS 10-1 may stop packet transmission to the MS 30 and may send DL-MAP to the MS 30.

Next, the MS 30 determines whether the intensity of the radio waves from the SBS 10-1 is a predetermined HO threshold value or less (step S6). If it is determined that the intensity of the radio waves from the SBS 10-1 is the predetermined HO threshold value or less, the MS 30 selects a destination device from the NBS 10-2 and the AR 20 held in the BS information table 322 (step S7). At that time, the MS 30 may select a communication device with the highest intensity of radio waves from the NBS 10-2 and the AR 20 held in the BS information table 322.

Then, the identity judging unit 33 of the MS 30 determines whether preamble indexes before and after the switching match with reference to the preamble index of the destination communication device acquired at the preamble synchronization (step S8).

If it is determined that the preamble indexes before and after the switching match (step S8: Yes route), the MS 30 will connect to substantially the same SBS 10-1 before and after the switching, and thus, the MS 30 switches the frequency (step S12). On the other hand, since the new communication destination AR 20 relays the radio signal of the SBS 10-1 as is, BSID "0xAAAAAA-400001" that is assigned to the AR 20 for the sake of convenience is not included in the actual radio signal. Accordingly, the MS 30 executes replacement of the BSID, following the preamble index in the BS information table 322, so that the BSID includes the BSID "0xAAAAAA-000001" of the SBS 10-1 that the AR 20 relays (step S13). For the communication connection parameters used before and after the switching of the frequency, the parameters (except the frequency) that are used for the communication with the SBS 10-1 may be used.

On the other hand, if it is determined that the preamble indexes before and after the switching do not match (step S8: No route), the MS 30 will connect to the substantially different NBS 10-2 after the switching, and thus, the MS 30 executes the HO process (step S9). Specifically, the communication controller 32 of the MS 30 transmits a MOB_MSHO-REQ message to the SBS 10-1. The MOB_MSHO-REQ message includes, for example, the BSID of the NBS 10-2 or the $AR_{NBS}$ 20-3 that is a target communication device.

The SBS 10-1 that has received the MOB_MSHO-REQ message may determine the BS type of the target device with reference to the repeater identifier flag of the BSID included in the MOB_MSHO-REQ message.

If the target device is the NBS 10-2 (the LSB of the BSID does not start from "4"), information for HO is transmitted to the NBS 10-2. On the other hand, if the target device is the $AR_{NBS}$ 20-3 (the LSB of the BSID starts from "4"), information for HO is transmitted to the NBS 10-2 that is the reference of the $AR_{NBS}$ 20-3. However, if the BS 10 of the reference of the target AR 20 included in the MOB_MSHO-REQ message is included as a candidate of the target BS 10 in the message, the above information may be transmitted only to the BS 10.

Next, the SBS 10-1 sends a MOB_BSHO-RSP message to the MS 30. The MS 30 that has received the MOB_BSHO-RSP message transmits the BSID of the target device, included in a MOB_HO-IND message, to the SBS 10-1. If the target device is the AR 20 (the LSB of the BSID starts from "4"), the BSID of the BS 10 that is the reference of the AR 20 is included.

Next, the communication controller 32 of the MS 30 instructs the radio transceiver 31 to switch the frequency (step S10). For example, to perform HO from the SBS 10-1 to the $AR_{NBS}$ 20-3, the frequency is switched from f1 to f4.

When the MS 30 completes the switching of the frequency to synchronize with the target device, the communication controller 32 executes the network re-entry process (step S11). By executing the network re-entry process, the MS 30 may reconnect to the target NBS 10-2 or $AR_{NBS}$ 20-3 to take over information of the communication connection parameters, the service flow, etc. from the SBS 10-1 that is connected till then.

As described above, according to the communication control method of this embodiment, the MS 30 may determine whether the connection destination is substantially the same based on transmission-source identification information included in radio signals before and after the switching of the frequency. If two pieces of transmission-source identification information before and after the switching of the frequency match, the MS 30 may omit the network re-entry process.

As a result, the redundant protocol procedure may be omitted, allowing radio communication with the BS 10 via the AR 20 to be restarted at high speed and improving the efficiency of the connection process of the MS 30.

[2] Other Embodiments

Figure 10:
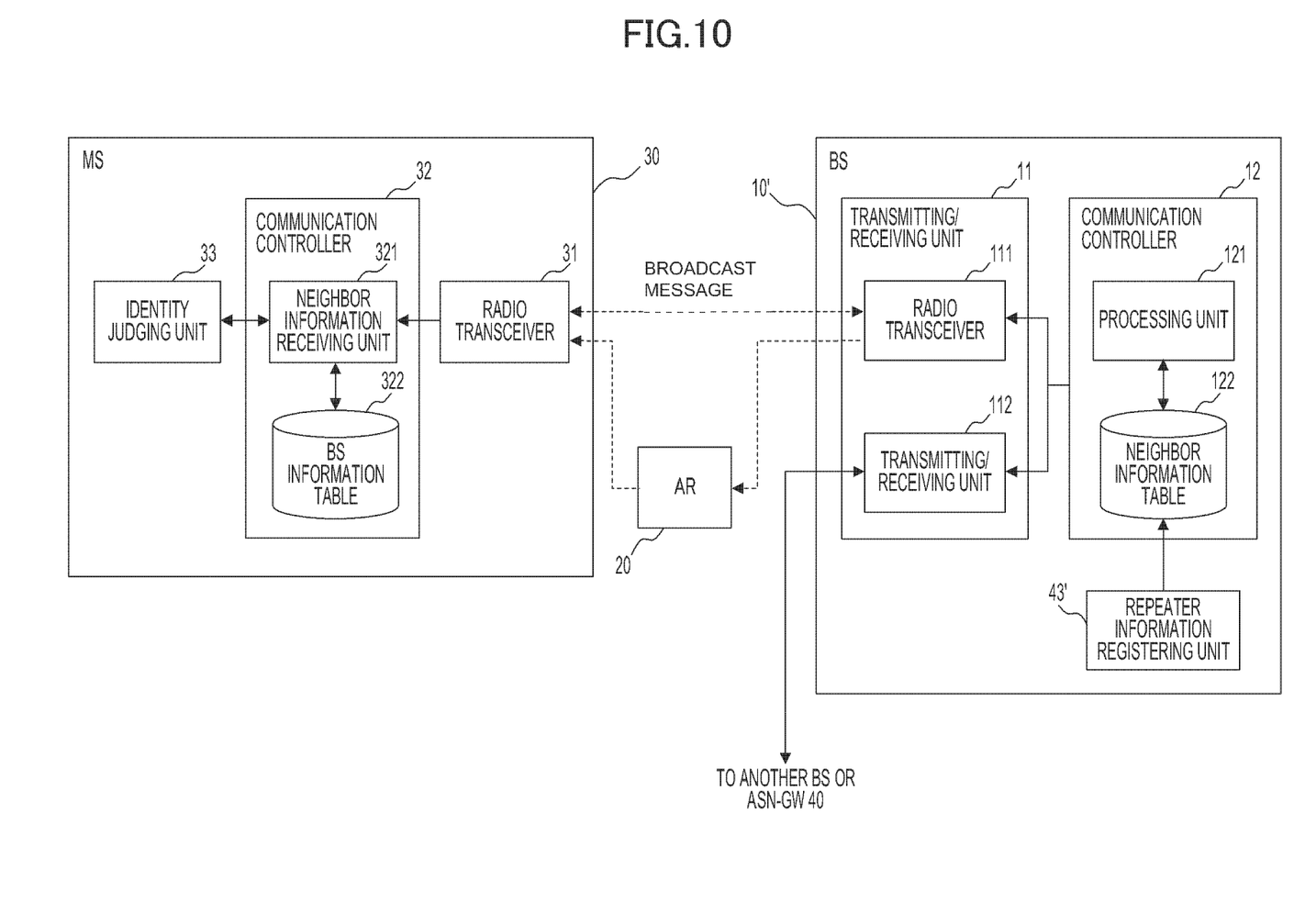
FIG. 10 is an example of the configuration of the radio communication system illustrated in FIG. 1.

With the above radio communication system, the AR information is registered by the ASN-GW 40. Alternatively, as illustrated in FIG. 10, a BS 10' may have a repeater information registering unit 43' so that the AR information may be registered by the BS 10'. Components given the same reference numerals as in FIG. 2 have the same functions as described before.

The radio system exemplified in FIG. 10 may also offer the same advantages as described above.

The configurations and functions of the above BSs 10 and 10', the AR 20, the MS 30, and the ASN-GW 40 may be selected as desired or may be combined as appropriate.

The identity judging unit 33 may determine the substantial identity of connection destination based on information (for example, association information) included in radio signals that are actually received before and after the switching of the frequency.

Furthermore, the identity judging unit 33 may determine the identity using information of part of BSID, as well as the transmission-source identification information and the association information. For example, the identity judging unit 33 may determine the substantial identity of the connection destination before and after the switching of the frequency based on part or all of the LSB of the BSID.

The efficiency of the radio-terminal connection process may be increased.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication control method for a radio communication system including a radio base station, a radio terminal, and a relay station that receives a radio signal transmitted from the radio base station and relays the radio signal to the radio terminal at a transmission frequency different from a reception frequency, the communication control method comprising:
   broadcasting information on one or more transmission frequencies of radio base stations or relay stations, from the radio base station;
   and determining, by the radio terminal, whether two pieces of transmission-source identification information included in the radio signals that are received before and after switching a reception frequency match, the switching being conducted based on the information broadcasted from one of the radio base station directly and the radio base station via the relay station, wherein if the radio terminal determines that the two pieces of transmission-source identification information match, the radio terminal omits a terminal registering procedure after frame-synchronization with the radio communication system.

2. The communication control method according to claim 1, further comprising:
   broadcasting association information indicating association of the radio base station and the relay station, from the radio base station, wherein
   the determining by the radio terminal is performed based on the association information.

3. The communication control method according to claim 2, wherein the association information is set by a gateway unit that controls the radio base station.

4. The communication control method according to claim 1, wherein
   if the radio terminal determines that the two pieces of transmission-source identification information do not match before and after the switching, the radio terminal performs hand-over using connection information before the switching.

5. The communication control method according to claim 1, wherein the switching includes switching a transmission frequency to the radio base station.

6. The communication control method according to claim 1, wherein the information is set by a gateway unit that controls the radio base station.

7. A radio base station in a radio communication system including the radio base station, a radio terminal, and a relay station that receives a radio signal transmitted from the radio base station and relays the radio signal to the radio terminal at a transmission frequency different from a reception frequency, the radio base station comprising:
   a storage unit that stores information on a transmission frequency of the relay station; and
   a broadcasting unit that broadcasts the information stored in the storage unit so that the radio terminal that receives the broadcast information is able to determine whether two pieces of transmission-source identification information included in the broadcast information that are received before and after switching a reception frequency match, the switching being conducted based on the information broadcast from the radio base station directly and the radio base station via the relay station, wherein if the radio terminal determines that the two pieces of transmission-source identification information match, the radio terminal omits a terminal registering procedure after frame-synchronization with the radio communication system.

8. A radio terminal in a radio communication system including a radio base station, the radio terminal, and a relay station that receives a radio signal transmitted from the radio base station and relays the radio signal to the radio terminal at a transmission frequency different from a reception frequency, the radio terminal comprising:
   a receiving unit that receives information, broadcasted from the radio base station, on one or more transmission frequencies of radio base stations or relay stations;
   a determination unit that determines whether two pieces of transmission-source identification information included in the radio signals received before and after switching a reception frequency match, the switching being conducted based on the information received by the receiving unit from one of the radio base station directly and the radio base station via the relay station; and
   a controller that omits a terminal registering procedure after frame-synchronization with the radio communication system if the determination unit determines that the two pieces of transmission-source identification information match.

* * * * *